Patented Oct. 14, 1941

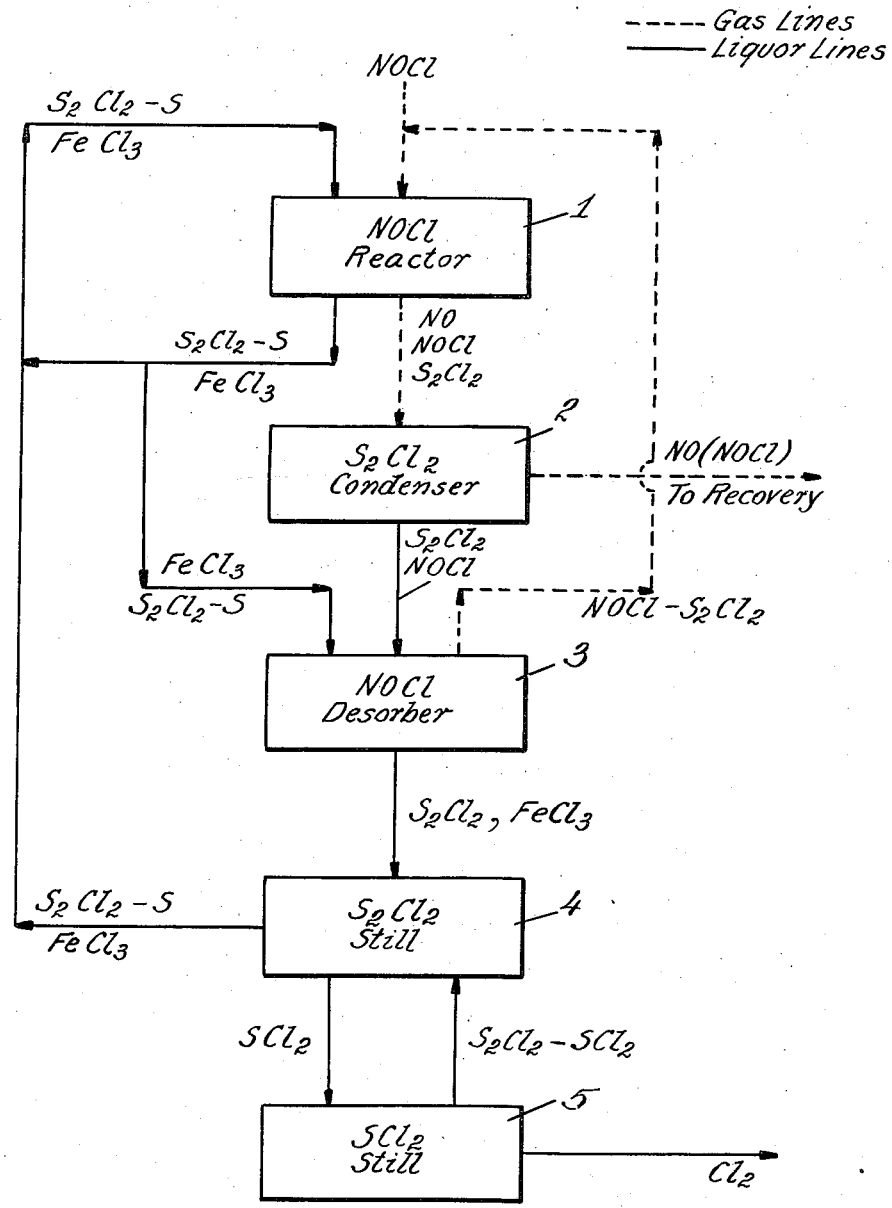

2,258,772

UNITED STATES PATENT OFFICE 2,258,772

PROCESS OF RECOVERING CHLORINE FROM NITROSYL CHLORIDE-CONTAINING GASES

William C. Klingelhoefer, Syracuse, N. Y., assignor to The Solvay Process Company, New York, N. Y., a corporation of New York Application November 4, 1938, Serial No. 238,807

11 Claims. (Cl. 23—219)

This invention relates to the recovery of chlorine from nitrosyl chloride-containing gases. More particularly, this invention relates to the recovery of chlorine from nitrosyl chloride-containing gases produced in the manufacture of alkali metal nitrates by the reaction of nitric acid with alkali metal chlorides.

In the process for producing alkali metal nitrates by the reaction of alkali metal chlorides with nitric acid, a gaseous mixture containing approximately equimolecular proportions of chlorine and nitrosyl chloride results; i. e., one-third of the chlorine in the reaction products is in combined form in the nitrosyl chloride. In many cases it is highly desirable to recover the combined chlorine in nitrosyl chloride as elemental chlorine.

It is the object of this invention to provide a simple and economical method for the recovery of elemental chlorine from nitrosyl chloride.

I have discovered that the combined chlorine in nitrosyl chloride may be recovered as elemental chlorine by reacting the nitrosyl chloride with sulfur to produce sulfur monochloride and distilling the sulfur monochloride to recover elemental chlorine therefrom. The distillation of the sulfur monochloride to recover elemental chlorine therefrom is preferably carried out in two stages by distilling the sulfur monochloride, preferably in the presence of a catalyst, to yield a distillate consisting of a sulfur-chlorine composition of considerably higher chlorine content than sulfur monochloride and which comprises chiefly sulfur dichloride, and then distilling the high chlorine-content composition to produce elemental chlorine. The residue from the first stage of the distillation has been found to consist chiefly of a solution of sulfur in sulfur monochloride and may be reacted with additional quantities of nitrosyl chloride to convert the sulfur contained therein to sulfur monochloride. The residue from the second stage of the distillation comprises essentially a sulfur monochloride-sulfur dichloride solution, which solution may be distilled to recover additional quantities of a high chlorine-content product in accordance with this invention.

In accordance with the process of my invention, nitrosyl chloride, which may be produced by the reaction of an alkali metal chloride and nitric acid, is reacted with sulfur in any suitable manner to produce sulfur monochloride. Preferably this step is carried out by reacting nitrosyl chloride with a solution of sulfur in sulfur monochloride at a temperature of about 100° C. in a packed tower. The sulfur monochloride thus obtained is then distilled to recover elemental chlorine therefrom. This is preferably accomplished by distilling the sulfur monochloride to produce a sulfur-chlorine composition of a considerably higher chlorine content than sulfur monochloride, which composition comprises chiefly sulfur dichloride, and then separately distilling the high chlorine-content composition thus obtained to recover chlorine. I have found that the presence of a small amount of ferric chloride, antimony trichloride, a mixture of ferric chloride and antimony trichloride, or iodine in the sulfur monochloride being distilled increases its dissociation into the desired high chlorine-content composition to a marked degree; preferably, therefore, the sulfur monochloride being distilled has dissolved therein about 0.2% ferric chloride or about 2% antimony trichloride or iodine, the use of ferric chloride being preferred.

The distillation of the sulfur monochloride is most advantageously carried out in a bubble cap tower at a pressure of from about one to about 10 atmospheres, preferably about one atmosphere. When the sulfur monochloride is distilled in the presence of ferric chloride, the tower is provided with between 6 and 8 plates, depending upon the reflux ratio employed which may vary between about 25 and about 20 respectively. It has been found that under these conditions sulfur monochloride yields on distillation a gaseous sulfur-chlorine composition containing approximately 67 atom % chlorine and which comprises chiefly sulfur dichloride. The residue from this distillation contains approximately 40 atom % chlorine and consists essentially of a solution of sulfur in sulfur monochloride; hence it is suitable for further reaction with nitrosyl chloride to produce additional quantities of sulfur monochloride.

The high chlorine-content product of the distillation of the sulfur monochloride, which comprises substantially sulfur dichloride, is then passed to another distilling column wherein it is distilled to produce free chlorine. Preferably this distillation is carried out in a bubble cap tower at a pressure of from about one to about 20 atmospheres, preferably about 10 or 11 atmospheres, to permit the condensation of essentially pure chlorine at the top of the column using readily available cooling water, the temperature of which may be as high as 30° to 40° C. Thus, for example, when operating under 10 atmospheres pressure, chlorine may be condensed at 38° C. The tower should contain between 6 and 10 or more plates, depending upon the reflux ratio employed, which may vary between about 1.50 and about 1.16. Operating under these conditions it has been found that a product containing 100 atom % chlorine, and which is, therefore, essentially pure chlorine may be recovered from the still. The residue, which contains approximately 63 atom % chlorine and which consists essentially of a mixture of sulfur monochloride and sulfur dichloride, is returned to the sulfur monochloride distillation step previously described for the production of further quantities of sulfur dichloride.

In the accompanying drawing forming a part of this specification, a preferred manner of carrying out the process of my invention is illustrated diagrammatically. As shown in the drawing, nitrosyl chloride and a sulfur-sulfur monochloride solution, containing approximately 10% ferric chloride and preheated to a temperature of about 100° C., are passed into NOCl reactor 1, which may be an ordinary packed tower. The nitrosyl chloride and sulfur-sulfur monochloride solution are passed cocurrently through NOCl reactor 1; the nitrosyl chloride reacts with the sulfur to form sulfur monochloride and nitric oxide. The vapors from NOCl reactor 1, which comprise nitric oxide, sulfur monochloride, and unreacted nitrosyl chloride, are then passed to $S_2Cl_2$ condenser 2, wherein the gas is cooled to approximately 25° C. to condense the sulfur monochloride. The nitric oxide and nitrosyl chloride vapors are not condensed and pass from condenser 2. These vapors may be treated in any suitable manner to separate the nitric oxide and nitrosyl chloride, the latter then being returned to reactor 1.

The liquid sulfur monochloride thus obtained contains a small amount of nitrosyl chloride dissolved therein and is passed from $S_2Cl_2$ condenser 2 to NOCl desorber 3. The liquid withdrawn from NOCl reactor 1, which consists chiefly of a slurry containing somewhat more than 10% ferric chloride in a sulfur-sulfur monochloride solution, is combined with the sulfur-sulfur monochloride solution withdrawn from the $S_2Cl_2$ still 4, as described below, and recirculated to NOCl reactor 1. However, preferably a small proportion of this circulating slurry from NOCl reactor 1 is mixed with the sulfur monochloride in desorber 3 in the amount of about one part of the slurry per 100 parts of sulfur monochloride in order to furnish ferric chloride catalyst to the sulfur monochloride distillation step carried out in $S_2Cl_2$ still 4, as described below.

NOCl desorber 3 is a distillation column either of the bubble cap type or of the packed tower type. Heat is supplied to the sulfur monochloride whereby practically all the nitrosyl chloride dissolved in the sulfur monochloride is distilled, along with appreciable amounts of sulfur monochloride vapors, leaving essentially sulfur monochloride containing the added ferric chloride. The nitrosyl chloride-sulfur monochloride vapors evolved from desorber 3 are preferably returned to NOCl reactor 1 for recovery. The sulfur monochloride containing the added ferric chloride withdrawn from desorber 3 is then passed to $S_2Cl_2$ still 4. This still is of the bubble cap type and the sulfur monochloride solution is distilled therein whereby it is dissociated to produce a distillate having a considerably higher chlorine content than the sulfur monochloride product being distilled and which comprises chiefly sulfur dichloride. The dissociation of the sulfur monochloride in $S_2Cl_2$ still 4 produces not only the high chlorine-content product but also a residue consisting of a solution of sulfur in sulfur monochloride and containing ferric chloride. This residue, as above pointed out, is withdrawn from still 4, mixed with the circulating slurry of sulfur and sulfur monochloride containing ferric chloride removed from reactor 1, and returned to reactor 1 for further reaction with nitrosyl chloride.

The distillate from $S_2Cl_2$ still 4 is passed to $SCl_2$ still 5. This still is of the bubble cap type and is operated at a pressure of about 10 to about 11 atmospheres in order to permit condensation of the chlorine product produced by the distillation in a condenser at the top of the column while using available cooling water which may be at a temperature of as high as about 30° to about 40° C. The distillation of the high chlorine-content composition in $SCl_2$ still 5 produces substantially pure chlorine which is condensed at the top of the tower and withdrawn as a liquid product. In addition to the chlorine distillate, a residue consisting chiefly of a mixture of sulfur monochloride and sulfur dichloride is produced; this residue is returned to $S_2Cl_2$ still 4 where it is subjected to further distillation in accordance with my invention.

The apparatus employed in the various steps of the process should be constructed of material which will resist the corrosive action of the various chemicals used. Steel has been found to be suitable for the handling of pure chlorine. However, apparatus coming into contact with the sulfur chlorides should be constructed either of nickel or of the metal known as "Dow Metal," a magnesium alloy.

The following example is illustrative of the process of my invention:

Nitrosyl chloride gas and a solution containing about 2.4 mol % nitrosyl chloride, 10.9 mol % sulfur ($S_8$), and 86.7 mol % sulfur monochloride and in which an amount of ferric chloride equal to about 10% of the total weight of the solution is present were heated to a temperature of about 100° C. The gas and the solution in the proportion of approximately 1120 pound mols of solution per 100 pound mols of gas were then passed cocurrently through a packed tower maintained at a temperature of about 100° C., wherein the nitrosyl chloride reacted with the sulfur to form sulfur monochloride and nitric oxide. The gases leaving the tower were at a temperature of about 98° C. and comprised nitric oxide, unreacted nitrosyl chloride, and sulfur monochloride vapors; these gases were then passed to a water-cooled tubular condenser and cooled to 25° C., whereby the sulfur monochloride condensed, the mixture of nitric oxide and nitrosyl chloride being withdrawn from the condenser. The liquid sulfur monochloride thus obtained contained dissolved therein about 6% nitrosyl chloride and was passed to a desorber column to remove the dissolved nitrosyl chloride. The liquid withdrawn from the cocurrent packed tower consisted of a sulfur-sulfur monochloride solution containing about 40 atom % chlorine and having suspended therein somewhat more than 10% by weight of ferric chloride. A portion of this solution equal to about one part of solution per 100 parts of sulfur monochloride liquor passed to the desorber was mixed with the sulfur monochloride in the desorber column, the remainder of the solution being returned to the tower for further reaction with nitrosyl chloride. In the desorber column the sulfur monochloride was heated to about 140° C., whereby a portion of the sulfur monochloride and practically all of the nitrosyl chloride vaporized and were returned to the tower wherein nitrosyl chloride reacted with the sulfur. The remaining sulfur monochloride, free of nitrosyl chloride and containing about 0.1% ferric chloride, was introduced into a bubble cap tower having 12 plates and the sulfur monochloride was distilled therein at atmospheric pressure, a reflux ratio of about 20 being employed. The condenser at the top of the column was maintained at a temperature of about 40° C. by a flow of cooling water. The distillate recovered from the condenser was found to contain approximately 67 atom % chlorine and to consist chiefly of sulfur dichloride. The residue, which contained approximately 40 atom % chlorine, was returned to the tower in which the reaction of sulfur with nitrosyl chloride was carried out to produce further quantities of sulfur monochloride.

The distillate containing sulfur dichloride obtained as described above was then pumped to a bubble cap tower having 10 plates, wherein it was distilled at a pressure of about 10 atmospheres, using a reflux ratio of about 1.50. The condenser at the top of the column was maintained at a temperature of about 36° C. by cooling water and a pressure of about 10 atmospheres whereby a distillate consisting of 100 atom percent chlorine was recovered. The residue, which contained about 63 atom percent chlorine, was returned to the sulfur monochloride distillation step described above.

It will be seen from the above description of my invention that nitrosyl chloride may be treated in a simple and economical manner so as to obtain elemental chlorine therefrom. This invention is of considerable value in the manufacture of alkali metal nitrates by the reaction of alkali metal chlorides with nitric acid because, by operating in accordance with my invention, practically all of the chlorine which is converted to nitrosyl chloride in the manufacture of the alkali metal nitrates may be recovered as elemental chlorine and sold as such.

What is claimed is:

1. In a process of recovering chlorine from nitrosyl chloride-containing gases, the steps which comprise reacting nitrosyl chloride with a sulfur-sulfur monochloride solution to produce sulfur monochloride, distilling the sulfur monochloride thus obtained in the presence of a relatively small amount of a catalyst which causes an increase in the rate of formation of sulfur dichloride from sulfur monochloride to produce a composition of considerably higher chlorine content than the sulfur monochloride and comprising sulfur dichloride, and distilling the high chlorine-content composition to recover elemental chlorine therefrom.

2. In a process of recovering chlorine from nitrosyl chloride-containing gases, the steps which comprise reacting nitrosyl chloride with a sulfur-sulfur monochloride solution to produce sulfur monochloride, subjecting the sulfur monochloride to reflux distillation to produce a composition having a considerably higher chlorine content than the sulfur monochloride and comprising sulfur dichloride, and subjecting the high chlorine-content composition to reflux distillation to recover elemental chlorine therefrom.

3. In a process of recovering chlorine from nitrosyl chloride-containing gases, the steps which comprise reacting nitrosyl chloride with sulfur to produce sulfur monochloride, distilling the sulfur monochloride thus obtained in the presence of a relatively small amount of a catalyst selected from the group consisting of ferric chloride, antimony trichloride, mixtures of ferric chloride and antimony trichloride, and iodine, fractionating the resulting vapors to separate as distillate a composition of considerably higher chlorine content than the sulfur monochloride and comprising sulfur dichloride, and distilling the high chlorine-content composition to recover elemental chlorine therefrom.

4. In a process of recovering chlorine from nitrosyl chloride-containing gases, the steps which comprise reacting nitrosyl chloride with sulfur to produce sulfur monochloride, distilling the sulfur monochloride thus obtained in the presence of a relatively small amount of ferric chloride, fractionating the resulting vapors to separate as distillate a composition of considerably higher chlorine content than the sulfur monochloride and comprising sulfur dichloride, and distilling the high chlorine-content composition to recover elemental chlorine therefrom.

5. In a process of recovering chlorine from nitrosyl chloride-containing gases, the steps which comprise reacting nitrosyl chloride with a sulfur-sulfur monochloride solution to produce sulfur monochloride, distilling the sulfur monochloride thus obtained at about atmospheric pressure to produce a composition of considerably higher chlorine content than the sulfur monochloride and comprising sulfur dichloride, and distilling the high chlorine-content composition at a pressure greater than atmospheric to recover elemental chlorine therefrom.

6. In a process of recovering chlorine from nitrosyl chloride-containing gases, the steps which comprise reacting nitrosyl chloride with a sulfur-sulfur monochloride solution to produce sulfur monochloride, distilling the sulfur monochloride thus obtained in the presence of a relatively small amount of ferric chloride to produce a composition of considerably higher chlorine content than the sulfur monochloride and comprising sulfur dichloride, and distilling the high chlorine-content composition at a pressure greater than atmospheric to recover elemental chlorine therefrom.

7. In a process for the recovery of elemental chlorine from nitrosyl chloride-containing gases, the steps which comprise reacting nitrosyl chloride with a sulfur-sulfur monochloride solution to form sulfur monochloride, distilling the sulfur monochloride in the presence of a relatively small amount of ferric chloride to produce as distillate a composition having a considerably higher chlorine content than the sulfur monochloride and comprising sulfur dichloride and to produce as residue of the sulfur monochloride distillation a sulfur-sulfur monochloride solution, utilizing the residue from this distillation to react with additional quantities of nitrosyl chloride to produce sulfur monochloride, distilling the high chlorine-content composition at a pressure greater than atmospheric to produce elemental chlorine, and returning the residue from the latter distillation to the sulfur monochloride distillation.

8. In a process for the recovery of elemental chlorine from nitrosyl chloride-containing gases, the steps which comprise reacting nitrosyl chloride with a sulfur-sulfur monochloride solution to form sulfur monochloride, distilling the sulfur monochloride at about atmospheric pressure in the presence of a relatively small amount of ferric chloride to produce as distillate a composition having a considerably higher chlorine content than the sulfur monochloride and comprising sulfur dichloride and to produce as residue of the sulfur monochloride distillation a sulfur-sulfur monochloride solution, utilizing the residue from this distillation to react with additional quantities of nitrosyl chloride to produce sulfur monochloride, distilling the high chlorine-content composition at a pressure of between about 10 and about 11 atmospheres to produce elemental chlorine, and returning the residue from the latter distillation to the sulfur monochloride distillation.

9. The process which comprises distilling sulfur monochloride in the presence of a catalyst selected from the group consisting of ferric chloride, antimony trichloride, mixtures of ferric chloride and antimony trichloride, and iodine, and fractionating the resulting vapors to separate a distillate having a considerably higher chlorine content than sulfur monochloride and comprising sulfur dichloride.

10. In the process of recovering chlorine from nitrosyl chloride-containing gases, the steps which comprise reacting nitrosyl chloride with a sulfur-sulfur monochloride solution to produce sulfur monochloride, heating the sulfur monochloride to produce a composition of considerably higher chlorine content than the sulfur monochloride and comprising sulfur dichloride, heating the high chlorine-content composition to liberate elemental chlorine, and recovering the chlorine.

11. In a process of recovering chlorine from nitrosyl chloride-containing gases, the steps which comprise reacting nitrosyl chloride with a sulfur-sulfur monochloride solution to produce sulfur monochloride, subjecting the sulfur monochloride to distillation to produce as distillate a composition having a considerably higher chlorine content than the sulfur monochloride and comprising sulfur dichloride and to produce as residue of the sulfur monochloride distillation a sulfur-sulfur monochloride solution, and subjecting the high chlorine-content composition to distillation to recover elemental chlorine therefrom.

WILLIAM C. KLINGELHOEFER.